United States Patent
Kitamura

(10) Patent No.: US 11,762,561 B2
(45) Date of Patent: Sep. 19, 2023

(54) INFORMATION PROCESSING DEVICE AND CONTROL METHOD ISSUING COMMANDS BASED ON LATENCY INFORMATION

(71) Applicant: FUJITSU LIMITED, Kawasaki (JP)

(72) Inventor: Yasuhiro Kitamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 17/582,036

(22) Filed: Jan. 24, 2022

(65) Prior Publication Data
US 2022/0342557 A1   Oct. 27, 2022

(30) Foreign Application Priority Data

Apr. 27, 2021   (JP) .................................. 2021-074596

(51) Int. Cl.
*G06F 3/06* (2006.01)
*G06F 12/14* (2006.01)

(52) U.S. Cl.
CPC .......... *G06F 3/0611* (2013.01); *G06F 3/0653* (2013.01); *G06F 3/0673* (2013.01); *G06F 12/1416* (2013.01); *G06F 2212/1024* (2013.01)

(58) Field of Classification Search
CPC .. G06F 12/1416; G06F 3/0611; G06F 3/0653; G06F 3/0673; G06F 2212/1024
See application file for complete search history.

(56) References Cited

U.S. PATENT DOCUMENTS

| | | | | |
|---|---|---|---|---|
| 8,321,627 B1* | 11/2012 | Norrie | ................... | G06F 13/161 365/185.33 |
| 2011/0238941 A1* | 9/2011 | Xu | ..................... | G06F 13/1689 711/E12.001 |
| 2014/0089586 A1* | 3/2014 | Hikichi | ............... | G06F 12/0846 711/122 |
| 2014/0317361 A1* | 10/2014 | Dally | .................... | G06F 13/161 711/154 |
| 2017/0083474 A1* | 3/2017 | Meswani | ............ | G06F 12/0862 |
| 2018/0239720 A1 | 8/2018 | Kanoh | | |
| 2021/0081235 A1* | 3/2021 | Goto | ..................... | G06F 9/4818 |
| 2021/0096750 A1* | 4/2021 | Balakrishnan | ........ | G06F 3/0611 |

FOREIGN PATENT DOCUMENTS

| | | |
|---|---|---|
| JP | 2001-154913 A | 6/2001 |
| JP | 2018-136592 A | 8/2018 |

OTHER PUBLICATIONS

Ma Chiyuan and Ni Xiaoqiang, "A memory schedule policy oriented to stream architecture," 2014 IEEE 20th International Conference on Embedded and Real-Time Computing Systems and Applications, Chongqing, China, 2014, pp. 1-5.*

* cited by examiner

*Primary Examiner* — Pierre Michel Bataille
(74) *Attorney, Agent, or Firm* — Fujitsu Patent Center

(57) ABSTRACT

An information processing device include: a memory; and a processor coupled to the memory and configured to: receive an access request directed to an access target and sets the access request in any one of a plurality of pending entries each of which includes latency information; issue a command that corresponds to the access request; control issuance of the command on a basis of the latency information of the any one of the pending entries; set a value that indicates latency for the access request in the latency information of the any one of the pending entries; and subtract a predetermined value from the latency information of the any one of the pending entries for each unit of time.

8 Claims, 12 Drawing Sheets

INFORMATION PROCESSING DEVICE AND CONTROL METHOD ISSUING COMMANDS BASED ON LATENCY INFORMATION

CROSS-REFERENCE TO RELATED APPLICATION

This application is based upon and claims the benefit of priority of the prior Japanese Patent Application No. 2021-74596, filed on Apr. 27, 2021, the entire contents of which are incorporated herein by reference.

FIELD

The embodiment discussed herein is related to a control technique.

BACKGROUND

A dual data rate (DDR) memory is used as a memory of an information processing apparatus (computer). A DDR synchronous dynamic random access memory (SDRAM) is an example of the DDR memory. At a time of using the DDR memory, a central processing unit (CPU) on the host side issues a command observing some penalties. For example, in a case of continuously accessing the DDR memory, the CPU switches a bank, which is a constituent unit of the DDR memory, to make access to observe the penalties.

Japanese Laid-open Patent Publication No. 2018-136592 and Japanese Laid-open Patent Publication No. 2001-154913 are disclosed as related art.

SUMMARY

According to an aspect of the embodiments, an information processing device include: a memory; and a processor coupled to the memory and configured to: receive an access request directed to an access target and sets the access request in any one of a plurality of pending entries each of which includes latency information; issue a command that corresponds to the access request; control issuance of the command on a basis of the latency information of the any one of the pending entries; set a value that indicates latency for the access request in the latency information of the any one of the pending entries; and subtract a predetermined value from the latency information of the any one of the pending entries for each unit of time.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A request generated by a program randomly specifying an address may cause an access conflict to the bank at times. In order to avoid performance degradation caused by such a conflict, it is effective to accumulate requests in a request queue in a memory control device and process the requests out of order on the basis of a busy state of the bank.

There has been known a memory control device that solves a phenomenon that a request issuance wait occurs and performance degradation occurs in relation to a memory having a plurality of banks. There has also been known a main memory control device that achieves optimum main memory access with a smaller logic amount.

In recent years, the number of banks included in the DDR memory has increased as the capacity of the DDR memory has increased. Furthermore, as the speed of the DDR memory has increased, the number of request queue entries in the memory control device has also increased to improve the performance of memory access.

The memory control device checks the busy state of the bank to be accessed by the request retained in each entry of the request queue to process the request out of order. However, a combination of the request and the busy state increases when the number of entries in the request queue and the number of busy states to be checked increase, whereby a circuit scale of the circuit to be subject to busy state checking increases.

Note that such a problem occurs not only in the processing of the request for the DDR memory but also in the processing of an access request for various access targets.

In one aspect, it is an object of the present embodiment to reduce a circuit scale of a control device that processes an access request directed to an access target.

Hereinafter, an embodiment will be described in detail with reference to the drawings.

Figure 1:
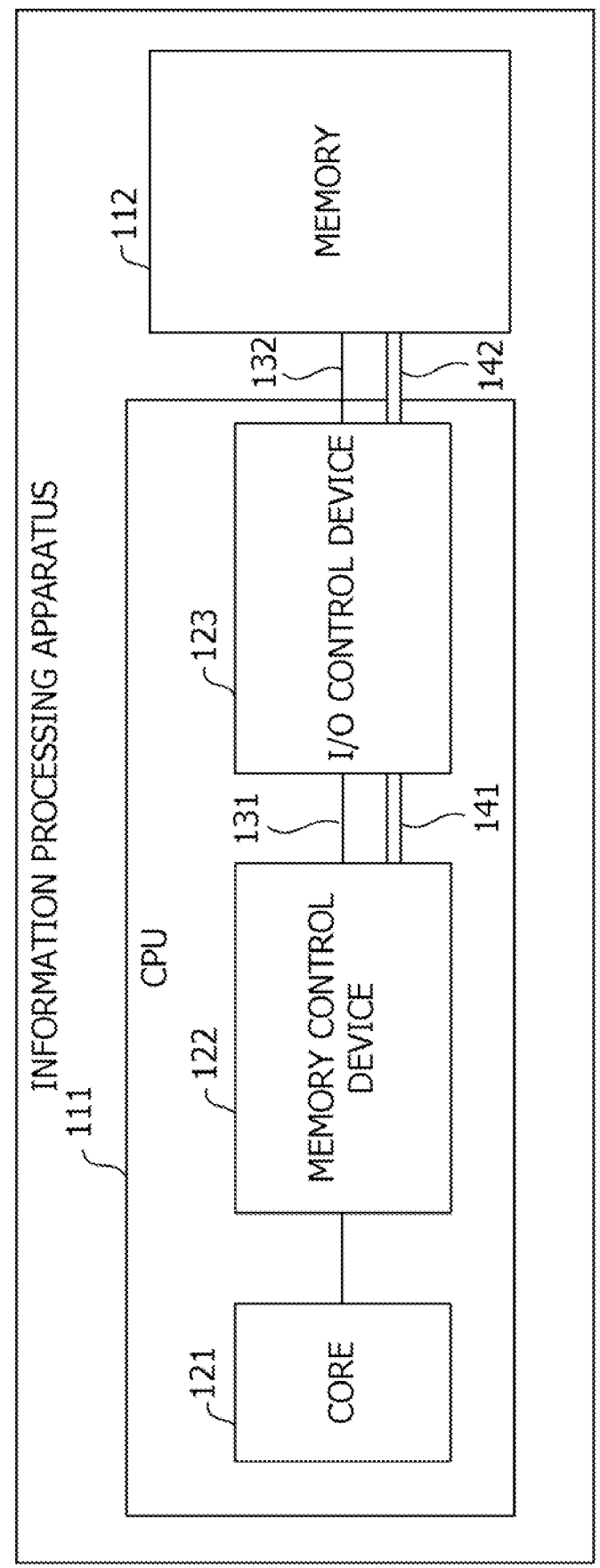
FIG. 1 is a configuration diagram of an information processing apparatus according to an embodiment.

FIG. 1 illustrates an exemplary hardware configuration of an information processing apparatus according to an embodiment. An information processing apparatus 101 of FIG. 1 includes a CPU 111 and a memory 112. The CPU 111 and the memory 112 are hardware. The memory 112 is, for example, a DDR memory, and includes a plurality of banks. The memory 112 may also be a dual inline memory module (DIMM). The memory 112 is an example of a storage device, and the bank is an example of an access target.

The CPU 111 includes a core 121, a memory control device 122, and an input/output (I/O) control device 123. Those constituent elements are hardware circuits. The memory control device 122 may be called a memory controller, and the I/O control device 123 may be called an I/O controller.

The memory control device 122 and the I/O control device 123 are connected by a command bus 131 and a data bus 141, and the I/O control device 123 and the memory 112 are connected by a command bus 132 and a data bus 142.

The core 121 executes a program, and transmits a memory access request to the memory control device 122. The memory access request is generated by the program specifying an address in the memory 112. The request transmitted from the core 121 is an example of the access request, and specifies any bank in the memory 112 as an access target.

The memory control device 122 converts the received request into a command corresponding to the request, and transmits the command after the conversion to the I/O control device 123 via the command bus 131. In a case where the received request is a write request, the memory control device 122 transmits write data to the I/O control device 123 via the data bus 141.

The I/O control device 123 receives a command via the command bus 131, and transmits the received command to the memory 112 via the command bus 132. Furthermore, the I/O control device 123 receives write data via the data bus 141, and transmits the received write data to the memory 112 via the data bus 142.

The memory 112 receives the command via the command bus 132, and receives the write data via the data bus 142. In a case where the received command is a read command, the memory 112 transmits, as read data, the data stored at the specified address to the I/O control device 123 via the data bus 142. In a case where the received command is a write command, the memory 112 stores the received write data at the specified address.

The I/O control device 123 receives read data via the data bus 142, and transmits the received read data to the memory control device 122 via the data bus 141. The memory control device 122 receives the read data via the data bus 141, and transmits the received read data to the core 121.

Figure 2:
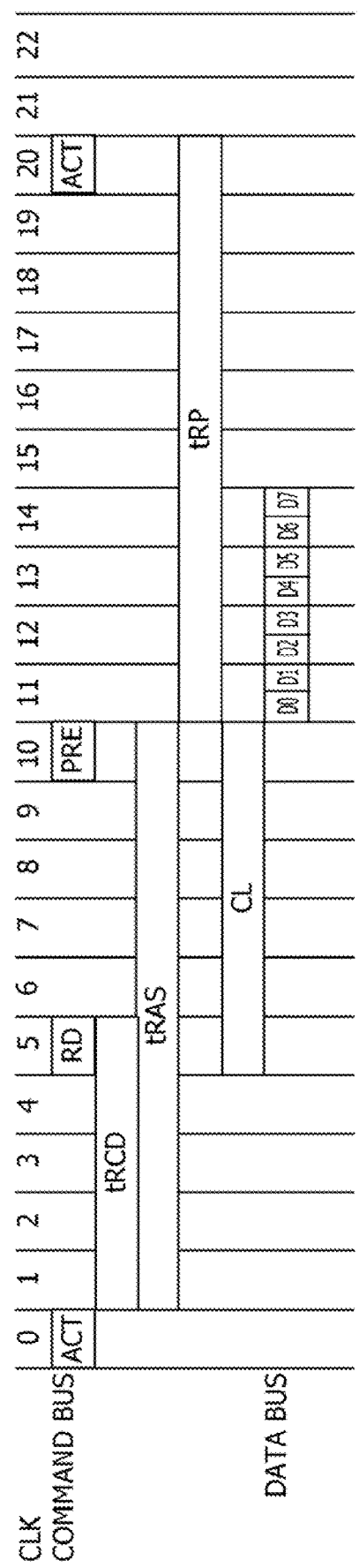
FIG. 2 is a timing chart of memory access by a read request.

FIG. 2 is a timing chart illustrating an example of the memory access by a read request in the information processing apparatus 101 of FIG. 1. CLK represents a clock cycle, a command bus represents a command on the command bus 132, and a data bus represents read data on the data bus 142. ACT represents an ACTIVATE command, RD represents a read command, and PRE represents a precharge command.

A Row Address to Column Delay (tRCD) represents a delay time from the ACT to the read command or write command, and Row Active Time (tRAS) represents a delay time from the ACT to the PRE. Column Address Strobe Latency (CL) represents a delay time from the RD to read data output, and a Row Precharge Time (tRP) represents a delay time from the PRE until the next ACT becomes issuable.

In the example of FIG. 2, the tRCD has 5 cycles, the tRAS has 10 cycles, the CL has 6 cycles, and the tRP has 10 cycles. The tRCD, tRAS, and tRP may be called memory penalties.

First, the CPU 111 issues an ACT in the CLK "0" to put the access target bank in the memory 112 into an ACTIVE state. Next, the CPU 111 issues an RD in the CLK "5", which is the time after the tRCD. As a result, a read data transfer is started in the CLK "11", which is the time after the CL, and read data D0 to read data D7 are transferred from the memory 112 to the CPU 111 in the CLK "11" to the CLK "14".

In the CLK "10", which is the time after the tRAS from the ACT, the CPU 111 issues a PRE, and performs closing processing of the access target bank. Then, in the CLK "20", which is the time after the tRP, the next ACT becomes issuable to the same bank. The bank is busy from the time of the first ACT to the time after tRAS+tRP.

Figure 3:
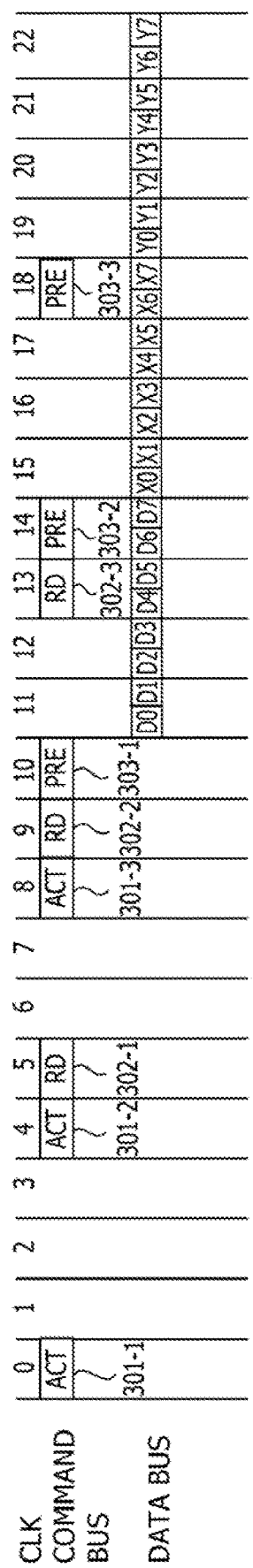
FIG. 3 is a timing chart of the memory access for accessing a plurality of banks in parallel.

FIG. 3 is a timing chart illustrating an example of the memory access for accessing a plurality of banks in parallel.

First, the CPU 111 issues an ACT 301-1 for the first bank in the CLK "0", and issues an RD 302-1 in the CLK "5", which is the time after the tRCD.

As a result, the read data transfer is started in the CLK "11", which is the time after the CL, and the read data D0 to the read data D7 are transferred from the first bank to the CPU 111 in the CLK "11" to the CLK "14". In the CLK "10", which is the time after the tRAS from the ACT 301-1, the CPU 111 issues a PRE 303-1, and performs closing processing of the first bank.

The CPU 111 issues an ACT 301-2 for the second bank in the CLK "4", and issues an RD 302-2 in the CLK "9", which is the time after the tRCD.

As a result, the read data transfer is started in the CLK "15", which is the time after the CL, and read data X0 to read data X7 are transferred from the second bank to the CPU 111 in the CLK "15" to the CLK "18". In the CLK "14", which is the time after the tRAS from the ACT 301-2, the CPU 111 issues a PRE 303-2, and performs closing processing of the second bank.

The CPU 111 issues an ACT 301-3 for the third bank in the CLK "8", and issues an RD 302-3 in the CLK "13", which is the time after the tRCD.

As a result, the read data transfer is started in the CLK "19", which is the time after the CL, and read data Y0 to read data Y7 are transferred from the third bank to the CPU 111 in the CLK "19" to the CLK "22". In the CLK "18", which is the time after the tRAS from the ACT 301-3, the CPU 111 issues a PRE 303-3, and performs closing processing of the third bank.

In the memory access of FIG. 3, the ACT 301-2 is issued 4 cycles after the ACT 301-1, and the ACT 301-3 is issued 4 cycles after the ACT 301-2. As a result, the read data is continuously transferred from the first to third banks to the CPU 111 in the CLK "11" to the CLK "22". Therefore, the throughput is improved as compared with the memory access of FIG. 2.

In order to efficiently use the plurality of banks, it is preferable to appropriately manage the busy state of the plurality of banks in the memory control device 122.

Figure 4:
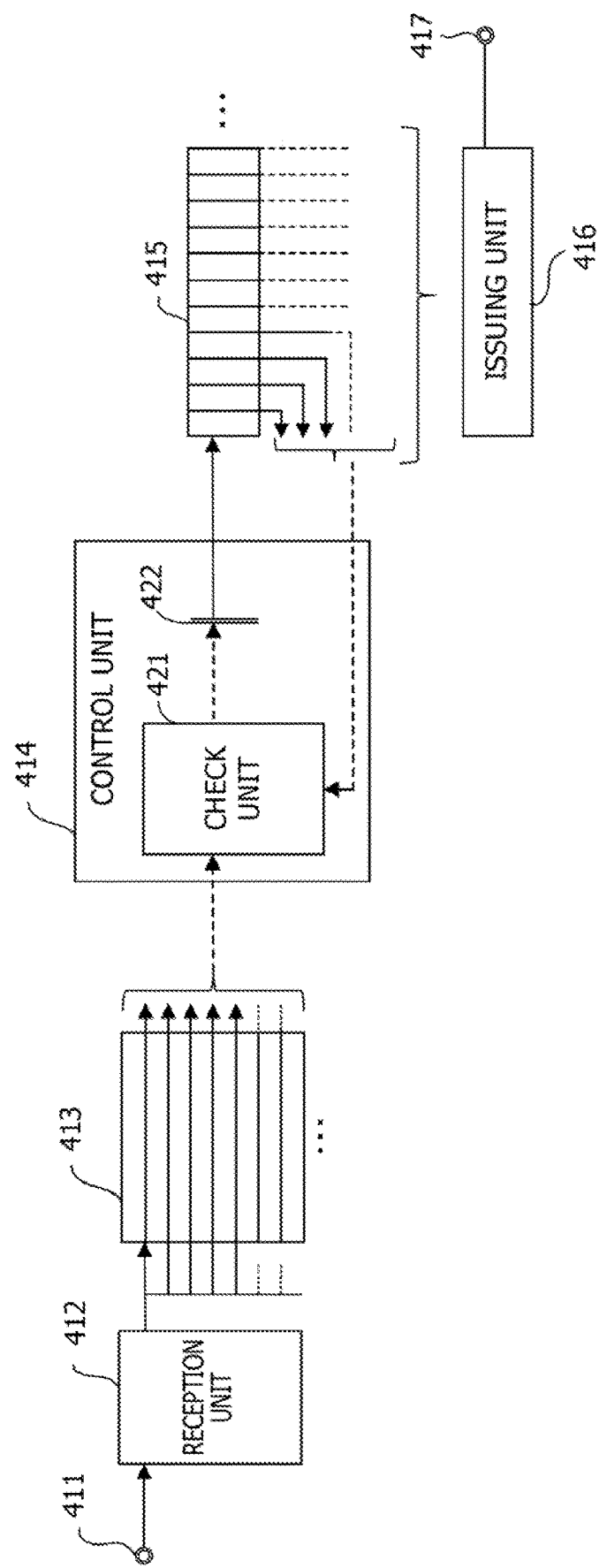
FIG. 4 is a hardware configuration diagram of a memory control device of a comparative example.

FIG. 4 illustrates an exemplary hardware configuration of a memory control device 122 of a comparative example. The memory control device 122 of FIG. 4 includes an input unit 411, a reception unit 412, a request queue 413, a control unit 414, a request pipeline 415, an issuing unit 416, and an output unit 417. Those constituent elements are hardware circuits. The control unit 414 includes a check unit 421 and an arbitration unit 422.

The request queue 413 contains N entries (N is an integer of two or more), and each entry retains a pending request. It becomes possible to efficiently use a plurality of banks by accumulating a plurality of requests in the request queue 413, selecting requests for accessible banks, and issuing commands out of order.

In a case where a request transmitted from the core 121 is input from the input unit 411, the reception unit 412 receives the input request, and sets the request in any entry of the request queue 413.

The request pipeline 415 contains M entries (M is an integer of two or more), and each entry retains a processed request corresponding to the issued command. The request pipeline 415 is used to keep a history of requests corresponding to issued commands. In a case where the access target bank of the retaining request is busy, each entry in the request pipeline 415 outputs the bank address of the bank to the control unit 414.

The check unit 421 of the control unit 414 monitors the request pipeline 415, selects a request for which a command is issuable from the request queue 413, and outputs it to the arbitration unit 422. The arbitration unit 422 includes a selector, and in a case where a plurality of requests is output from the check unit 421, it performs arbitration to select one of the requests, and outputs it to the request pipeline 415.

The issuing unit 416 issues a command corresponding to the request output from the control unit 414 to the I/O control device 123 via the output unit 417. The issuing unit 416 monitors the request pipeline 415, and issues a command while observing the memory penalty for each bank as illustrated in FIGS. 2 and 3.

Figure 5:
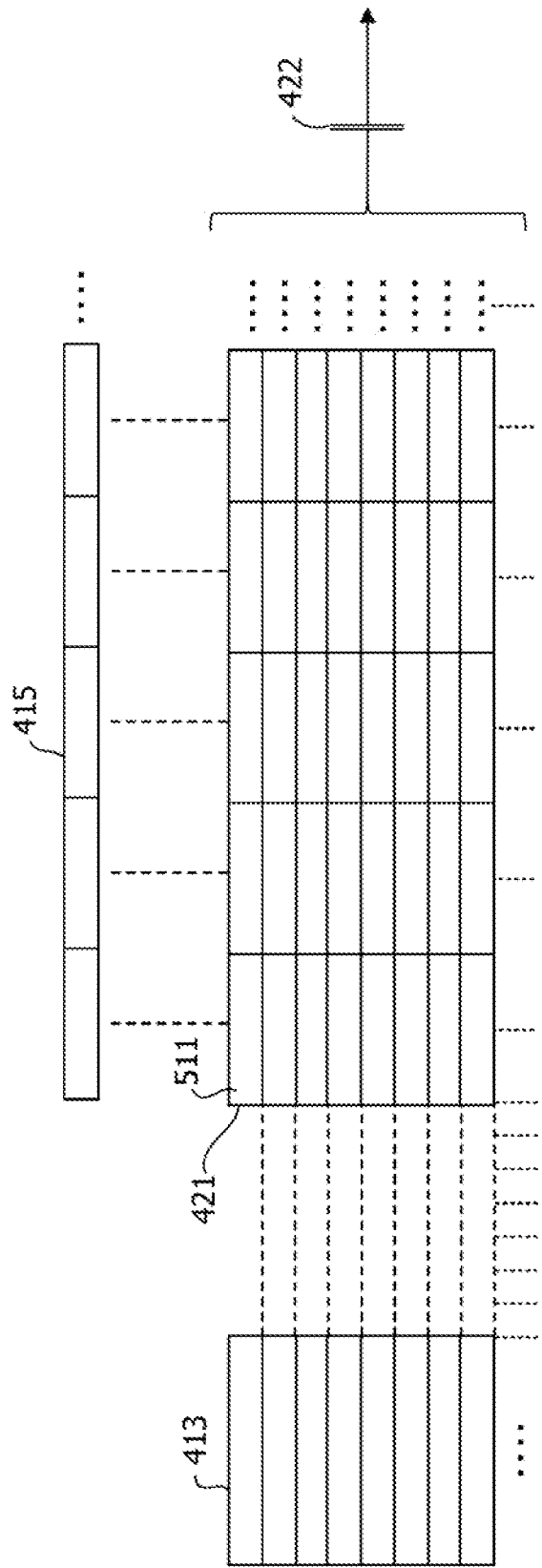
FIG. 5 is a hardware configuration diagram of a check unit.

FIG. 5 illustrates an exemplary hardware configuration of the check unit 421 in FIG. 4. The check unit 421 of FIG. 5 includes N×M comparators 511. Each of the comparators 511 compares the bank address output from each entry in the request queue 413 with busy information output from each entry in the request pipeline 415.

The bank address output from each entry in the request queue 413 is the bank address of the access target bank of the request retained in the entry.

The busy information output from each entry in the request pipeline 415 is the bank address of the access target bank of the request retained in the entry or a specific value indicating a state of not being busy. In a case where the access target bank is busy, the bank address of the bank is output, and the specific value is output in a case where the access target bank is not busy.

The comparator 511 outputs logic "1" in a case where the bank address output from the entry in the request queue 413 matches with the busy information output from the entry in the request pipeline 415, and outputs logic "0" in a case where both items do not match.

The bank address output from each entry in the request queue 413 and M pieces of busy information output from M entries in the request pipeline 415 are compared by the M comparators 511. In a case where any of the comparators 511 outputs the logic "1", the request retained in the entry is not selected. On the other hand, in a case where all the M comparators 511 output the logic "0", the request retained in the entry is selected, and is output to the arbitration unit 422.

In the memory control device 122 of FIG. 4, the N×M comparators 511 are provided to check whether or not the command corresponding to the pending request is issuable. Accordingly, N×M signal lines are connected between the request queue 413 and the check unit 421, and N×M signal lines are also connected between the request pipeline 415 and the check unit 421.

The number M of the entries in the request pipeline 415 increases as tRAS+tRP becomes longer, and tRAS+tRP becomes longer as the data transfer rate increases. Therefore, when the data transfer rate increases, M also increases. When both the number N of the entries in the request queue 413 and the number M of the entries in the request pipeline 415 increase, the number of the comparators 511 and the number of the signal lines become enormous, whereby the circuit scale of the memory control device 122 increases.

Figure 6:
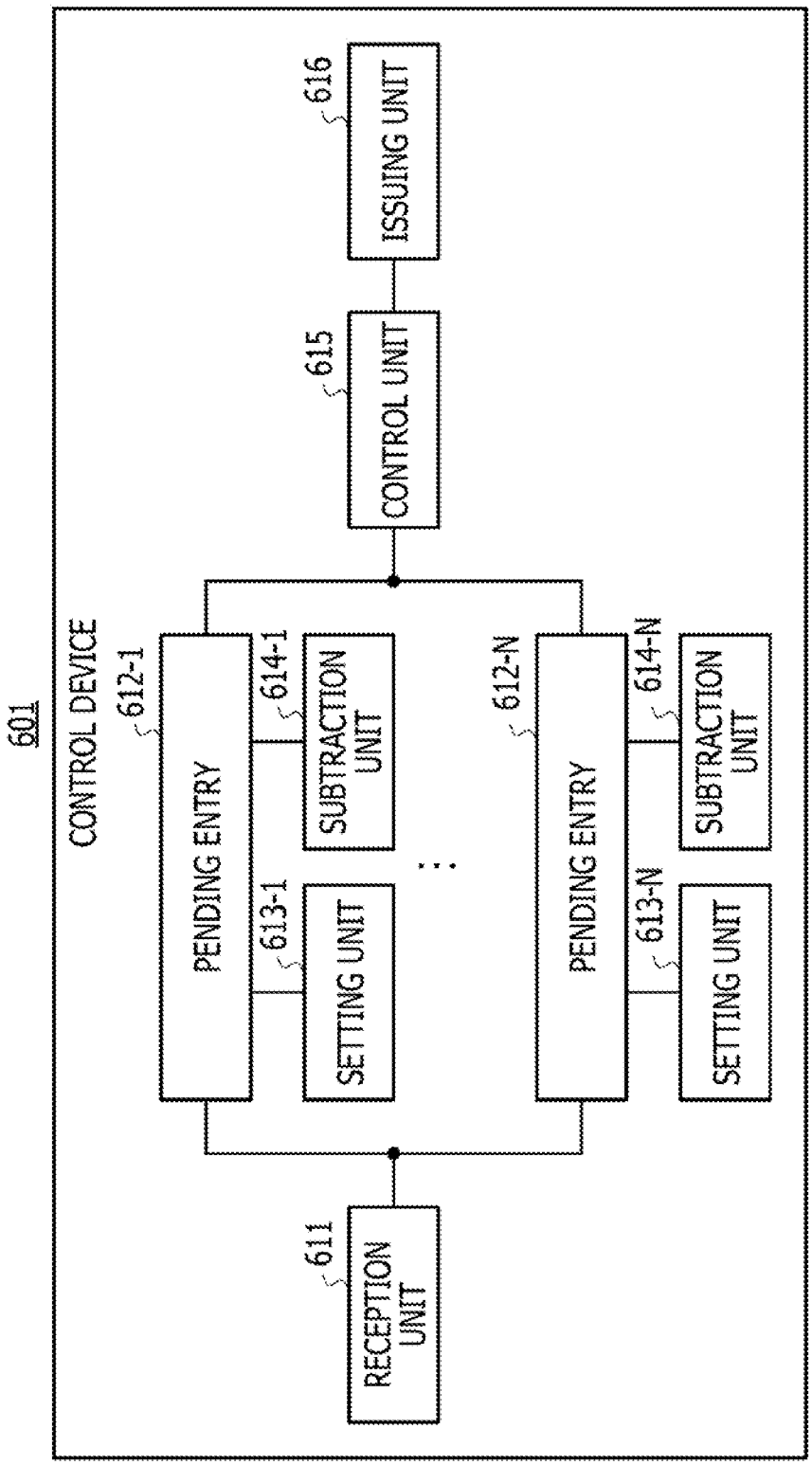
FIG. 6 is a configuration diagram of a control device according to the embodiment.

FIG. 6 illustrates an exemplary configuration of a control device 601 according to the embodiment. The control device 601 of FIG. 6 includes a reception unit 611, a control unit 615, and an issuing unit 616. Moreover, the control device 601 includes pending entries 612-1 to 612-N (N is an integer of two or more) each of which includes latency information, setting units 613-1 to 613-N, and subtraction units 614-1 to 614-N.

A setting units 613-$i$ and a subtraction unit 614-$i$ ($i$=1 to N) are associated with a pending entry 612-$i$. The control device 601 processes an access request directed to the access target.

Figure 7:
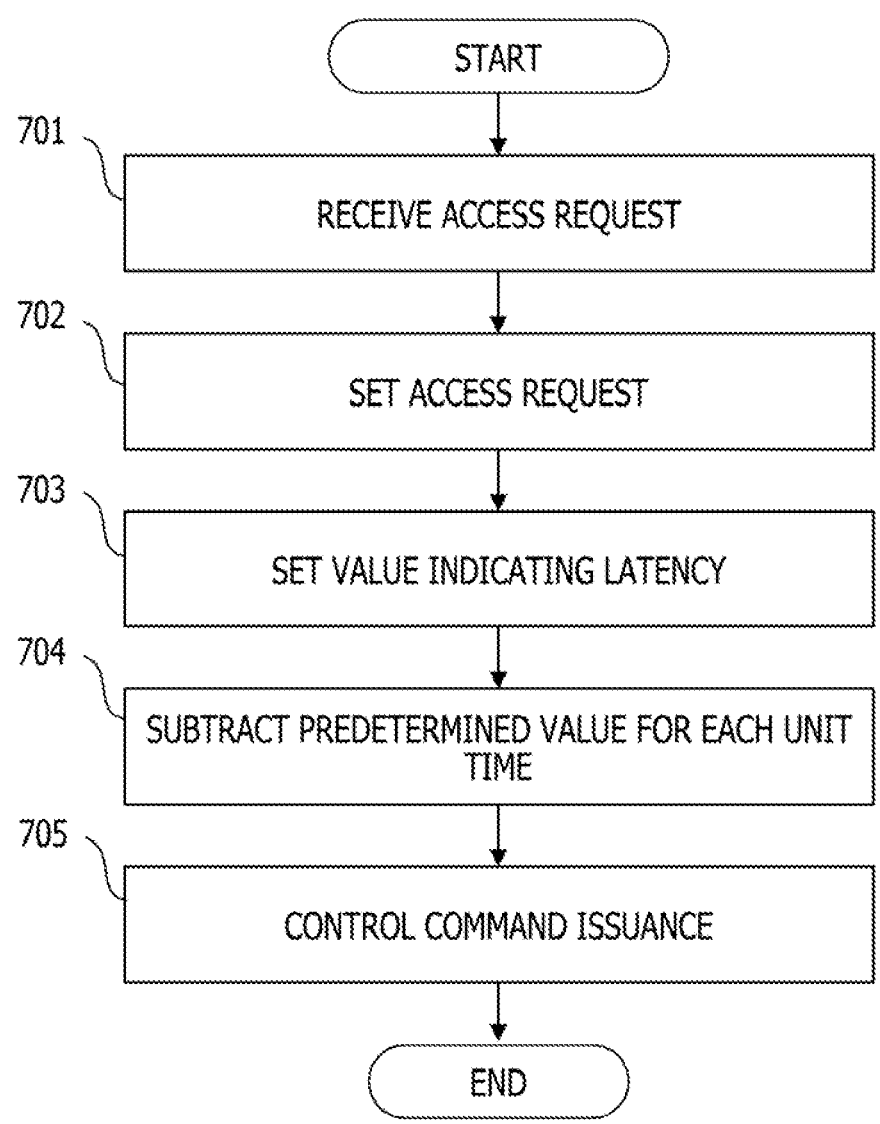
FIG. 7 is a flowchart of an access request process.

FIG. 7 is a flowchart illustrating an exemplary access request process to be performed by the control device 601 of FIG. 6. First, the reception unit 611 receives an access request (step 701), and sets the received access request in any of pending entries 612-$k$ ($k$=1 to N) (step 702).

Next, a setting unit 613-$k$ associated with the pending entry 612-$k$ in which the access request is set sets a value indicating latency for the access request in the latency information of the pending entry 612-$k$ (step 703). Next, a subtraction unit 614-$k$ associated with the pending entry 612-$k$ subtracts a predetermined value from the latency information of the pending entry 612-$k$ for each unit of time (step 704).

The control unit 615 controls issuance of the command corresponding to the access request on the basis of the latency information of the pending entry 612-$k$, and the issuing unit 616 issues the command under the control of the control unit 615 (step 705).

According to the control device 601 of FIG. 6, it becomes possible to reduce the circuit scale of the control device 601.

Figure 8:
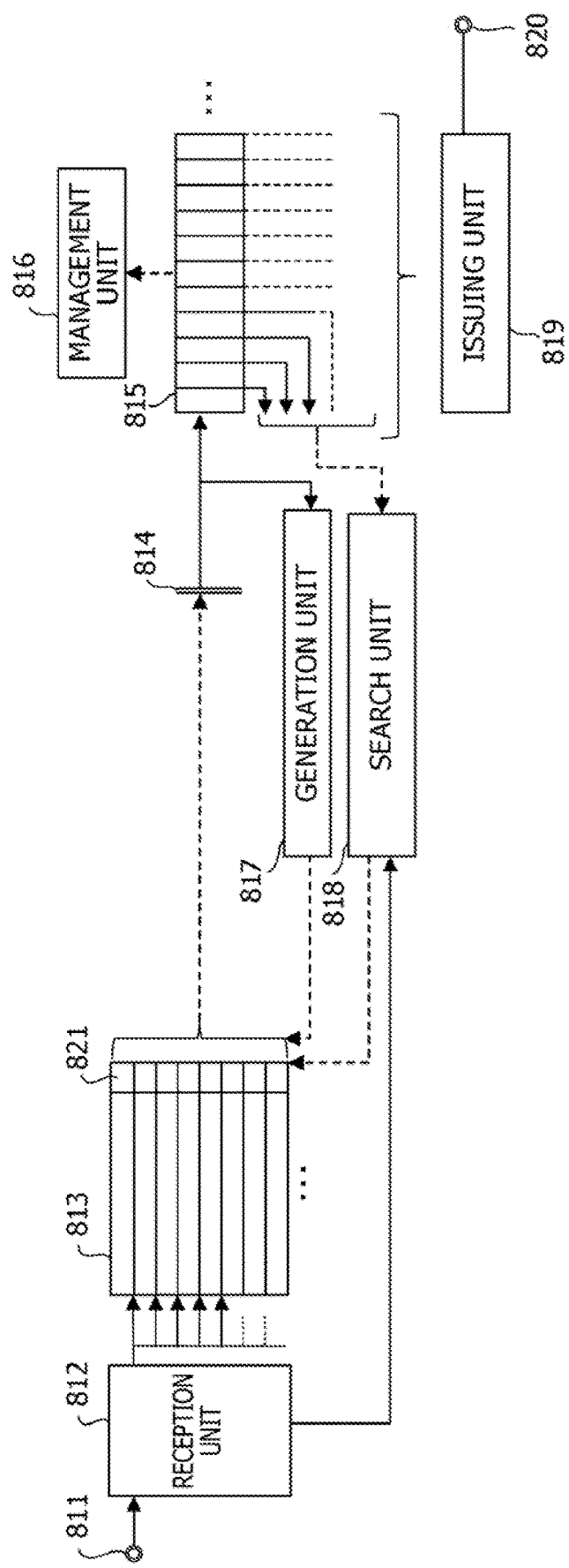
FIG. 8 is a hardware configuration diagram of the memory control device according to the embodiment.

FIG. 8 illustrates an exemplary hardware configuration of the memory control device 122 according to the embodiment. The memory control device 122 of FIG. 8 includes, in correspondence with the control device 601 of FIG. 6, an input unit 811, a reception unit 812, a request queue 813, an arbitration unit 814, a request pipeline 815, and a management unit 816. Moreover, the memory control device 122 includes a generation unit 817, a search unit 818, an issuing unit 819, and an output unit 820. Those constituent elements are hardware circuits.

The reception unit 812 and the issuing unit 819 correspond to the reception unit 611 and the issuing unit 616 in FIG. 6, respectively. The generation unit 817 is an example of an update unit, and the search unit 818 is an example of an acquisition unit.

The request queue 813 contains N entries, and each entry retains a pending request. Each entry includes a busy counter 821 that indicates a busy state of the access target bank of the request retained in the entry.

Figure 9:
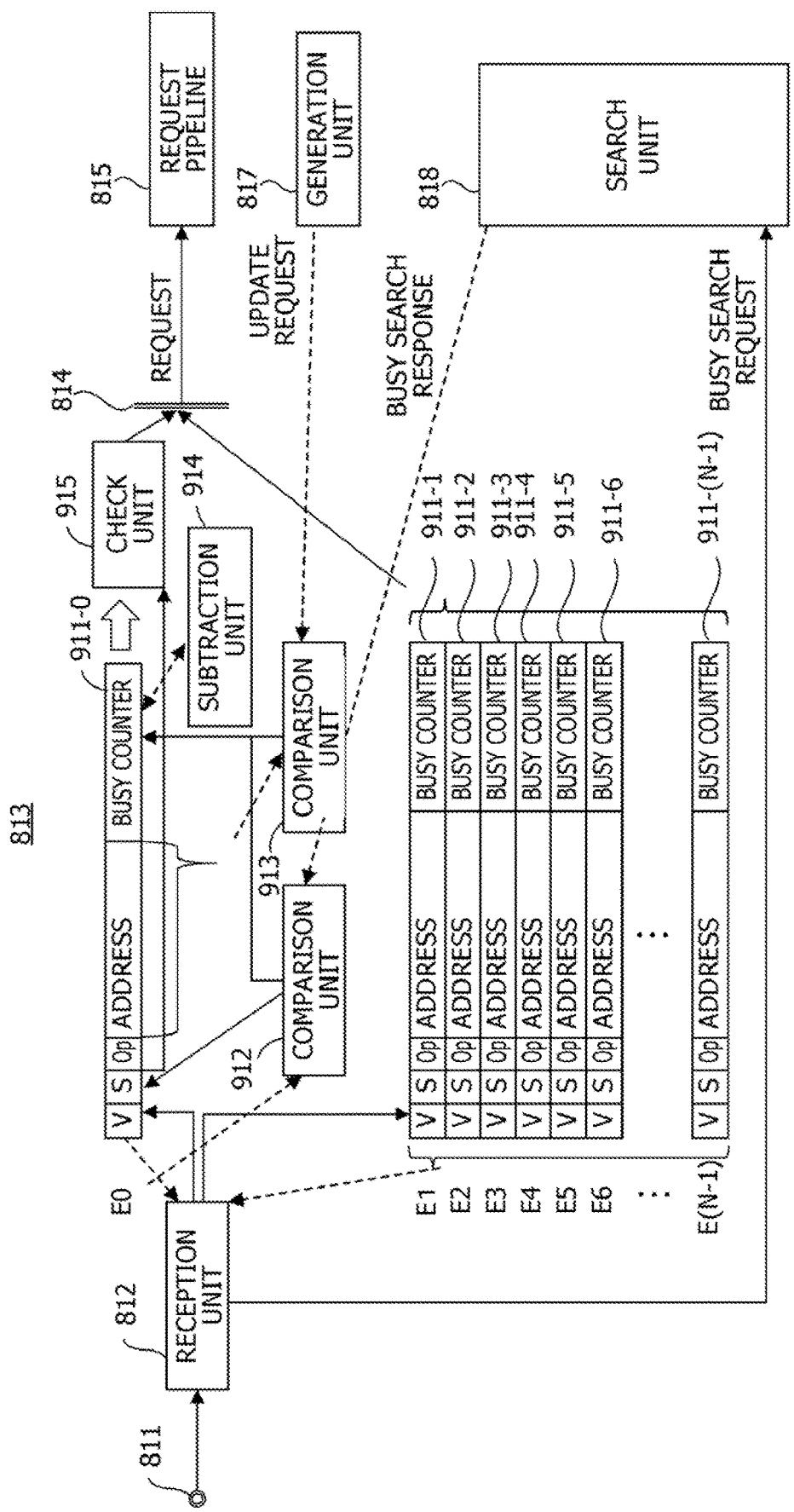
FIG. 9 is a hardware configuration diagram of a request queue.

FIG. 9 illustrates an exemplary hardware configuration of the request queue 813 in FIG. 8. The request queue 813 of FIG. 9 includes entries 911-0 to 911-(N−1), a comparison unit 912, a comparison unit 913, a subtraction unit 914, and a check unit 915. Those constituent elements are hardware circuits.

The comparison unit 912, the comparison unit 913, the subtraction unit 914, and the check unit 915 are associated with the entry 911-0. Although omitted in FIG. 9, the comparison unit 912, the comparison unit 913, the subtraction unit 914, and the check unit 915 are also associated with an entry 911-$i$ ($i$=1 to N−1) in a similar manner to the entry 911-0.

Each entry 911-$i$ ($i$=0 to N−1) corresponds to the pending entry 612-($i$+1) in FIG. 6. The comparison unit 912 and the comparison unit 913 associated with each entry 911-$i$ correspond to a setting unit 613-($i$+1) associated with the pending entry 612-($i$+1).

The subtraction unit 914 associated with each entry 911-$i$ corresponds to a subtraction unit 614-($i$+1) associated with the pending entry 612-($i$+1). The check unit 915 and the arbitration unit 814 associated with each entry 911-$i$ correspond to the control unit 615.

Each entry 911-*i* includes entry identifier (ID), a valid flag V, an entry set flag S, an operand Op, an address, and a busy counter. The entry ID is identification information of the entry 911-*i*, which is set in advance. The entry ID of the entry 911-*i* is "Ei".

The valid flag V indicates whether or not the entry 911-*i* retains a valid request. The entry 911-*i* retains a valid request in a case where the valid flag V is logic "1", and the entry 911-*i* does not retain a valid request in a case where the valid flag V is logic "0".

The entry set flag S indicates whether or not the busy search for the entry 911-*i* has been complete. The busy search has been complete in a case where the entry set flag S is logic "1", and the busy search has not been complete in a case where the entry set flag S is logic "0".

The operand Op indicates a type of the request, and contains information indicating either a read request or a write request, for example. The address represents an address of the data accessed by the request. The address of the data includes a bank address of the access target bank of the request and an address of a storage area in the bank. The operand Op and the address represent the request retained in the entry 911-*i*.

The busy counter corresponds to the busy counter 821 in FIG. 8, and indicates the latency for the request retained in the entry 911-*i*. The latency for the request is a remaining time until the busy state of the access target bank of the request is released, which is represented by, for example, the number of clock cycles. The bank is busy in a case where a value of the busy counter is other than zero, and the bank is not busy in a case where the busy counter is zero. The busy counter indicating the latency corresponds to the latency information.

The request pipeline 815 contains M entries, and each entry retains a processed request corresponding to the issued command. The request pipeline 815 is used to keep a history of requests corresponding to issued commands. The command corresponding to the request in the request pipeline 815 has been issued before the command corresponding to the request in the request queue 813.

Each entry in the request pipeline 815 includes an address and a counter. The address represents an address of data accessed by the issued command corresponding to the retained request. The address of the data includes a bank address of the access target bank of the request and an address of a storage area in the bank.

The counter indicates a time remaining until the next command of the issued command becomes issuable. The time remaining until the next command becomes issuable is the time remaining until the busy state of the access target bank of the retained request is released, which is represented by, for example, the number of clock cycles.

Each entry in the request pipeline 815 is an example of a processed entry, and the counter indicating the remaining time is an example of remaining time information.

The management unit 816 manages the counter and the request for each of the M entries of the request pipeline 815. When the command corresponding to the request is issued, the management unit 816 sets the request in the entry. Then, the management unit 816 sets a value T0 indicating a predetermined time in the counter of the entry, and subtracts a predetermined value from the counter for each clock cycle.

For example, tRAS+tRP, which is the memory penalty, is used as T0, and for example, one cycle is used as the predetermined value. In this case, the value of the counter is decremented by one for each clock cycle. The clock cycle corresponds to a unit of time.

In a case where the request transmitted from the core 121 is input from the input unit 811, the reception unit 812 receives the input request, and searches the request queue 813 for a free entry. The free entry is the entry 911-*i* with the valid flag V of the logic "0". Then, the reception unit 812 selects any entry 911-*k* from one or more free entries, and sets the received request in the selected entry 911-*k*. The entry 911-*k* is, for example, a free entry with the smallest entry ID.

At this time, the reception unit 812 sets the logic "1" in the valid flag V of the entry 911-*k*, and sets the operand and the address included in the received request in the operand Op and the address. Then, the reception unit 812 generates a busy search request, and transmits it to the search unit 818. The busy search request includes the entry ID of the entry 911-*k*, and the bank address included in the address of the entry 911-*k*. The busy search request is an example of a time acquisition request.

The search unit 818 searches the request pipeline 815 for the entry having the address including the bank address included in the received busy search request, and obtains a counter value from the entry. Then, the search unit 818 generates a busy search response on the basis of the obtained value, and transmits the generated busy search response to the comparison unit 912 associated with each entry 911-*i* in the request queue 813.

The busy search response includes entry ID included in the received busy search request, and a value indicating the latency for the request set in the entry 911-*k* indicated by the entry ID. The search unit 818 subtracts one from the obtained value, for example, thereby obtaining a value indicating the latency. The busy search response is an example of a time acquisition response.

The comparison unit 912 associated with each entry 911-*i* compares the entry ID of the entry 911-*i* with the entry ID included in the received busy search response. The entry ID of the entry 911-*i* is an example of first identification information, and the entry ID included in the busy search response is an example of second identification information.

In a case where the entry ID included in the busy search response matches the entry ID of the entry 911-*i*, the comparison unit 912 sets the value included in the busy search response in the busy counter of the entry 911-*i*. Then, the comparison unit 912 sets the logic "1" in the entry set flag S of the entry 911-*i*.

Since the entry ID included in the busy search response matches the entry ID of the entry 911-*k*, the comparison unit 912 associated with the entry 911-*k* sets the value included in the busy search response in the busy counter of the entry 911-*k*. Then, the comparison unit 912 sets the logic "1" in the entry set flag S of the entry 911-*k*.

With the busy search response transmitted from the search unit 818 to the comparison unit 912, it becomes possible to set the period during which the access target bank is busy in the busy counter of the entry 911-*k* as latency. At this time, with the latency set in a case where the entry ID included in the busy search response matches the entry ID of the entry 911-*i*, it becomes possible to identify the busy counter of the received request to set the latency.

In a case where a value of the busy counter of the entry 911-*k* is other than zero, the subtraction unit 914 associated with the entry 911-*k* subtracts a predetermined value from the busy counter for each clock cycle. For example, one cycle is used as the predetermined value. In this case, the value of the busy counter is decremented by one for each clock cycle.

The check unit 915 associated with the entry 911-k checks the entry set flag S and the busy counter of the entry 911-k. In a case where the entry set flag S is the logic "1" and the value of the busy counter is zero, the check unit 915 allows the request retained in the entry 911-k to be involved in arbitration.

Accordingly, the check unit 915 selects the operand Op and the address of the entry 911-k as a request for which a command is issuable, and outputs it to the arbitration unit 814. At this time, the check unit 915 sets the logic "0" in the valid flag V and the entry set flag S of the entry 911-k, thereby releasing the entry 911-k. As a result, the entry 911-k becomes a free entry.

The arbitration unit 814 includes a selector, and in a case where a plurality of requests is output from the entries 911-0 to 911-(N–1), it performs arbitration to select one of the requests, and outputs it to the request pipeline 815.

The issuing unit 819 issues a command corresponding to the request output from the arbitration unit 814 to the I/O control device 123 via the output unit 820. The issuing unit 819 monitors the request pipeline 815, and issues a command while observing the memory penalty for each bank as illustrated in FIGS. 2 and 3.

When the command corresponding to the request output from the arbitration unit 814 is issued, the generation unit 817 generates an update request on the basis of the value T0 indicating a predetermined time. Then, the generation unit 817 transmits the generated update request to the comparison unit 913 associated with each entry 911-i in the request queue 813.

The update request includes the bank address of the access target bank of the request corresponding to the issued command, and an update value indicating the updated latency for the request retained in each entry 911-i. The update value represents a time remaining until the next command becomes issuable, which is generated by the issued command. The generation unit 817 subtracts one from T0, for example, thereby obtaining an update value T0-1.

The comparison unit 913 associated with each entry 911-i compares the bank address included in the address of the entry 911-i with the bank address included in the received update request. The bank address included in the address of the entry 911-i is an example of first bank information, and the bank address included in the update request is an example of second bank information.

In a case where the bank address included in the update request matches the bank address included in the address of the entry 911-i, the comparison unit 913 sets the update value included in the update request in the busy counter of the entry 911-i. As a result, the value of the busy counter of the entry 911-i corresponding to the bank address included in the update request is updated. After the value of the busy counter is updated, the subtraction unit 914, the check unit 915, the arbitration unit 814, the request pipeline 815, and the issuing unit 819 perform operations similar to those before the update.

With the update request transmitted from the generation unit 817 to the comparison unit 913, it becomes possible to reflect the busy state of the bank newly generated in association with the command issuance in the busy counter. At this time, with the update value set in a case where the bank address included in the update request matches the bank address of the entry 911-i, it becomes possible to identify the busy counter of the request whose access target is the busy bank to set the update value.

With the search unit 818 and the generation unit 817 provided, it becomes possible to process the request retained in each entry 911-i out of order on the basis of the busy counter.

The check unit 421 of the comparison example illustrated in FIG. 5 directly compares the bank address output from each entry in the request queue 413 with the busy information output from each entry in the request pipeline 415 to check the busy state of the bank. When both the number of entries in the request queue 413 and the number of entries in the request pipeline 415 increase, the number of the comparators 511 and the number of the signal lines become enormous.

Meanwhile, in the memory control device 122 of FIG. 8, the busy counter is provided in each entry 911-i in the request queue 813, and the subtraction unit 914 and the check unit 915 are provided for each entry 911-i. This makes it possible to check the busy state of the bank while updating the busy counter for each entry 911-i in the request queue 813.

In this case, it only needs to provide the N comparison units 912 and the N comparison units 913 corresponding to the respective N entries 911-i, and it does not need to provide the N×M comparators 511. While N signal lines are connected between the N comparison units 912 and the search unit 818 and N signal lines are also connected between the N comparison units 913 and the generation unit 817, it does not need to connect N×M signal lines. Therefore, the wiring property is improved and the circuit scale is reduced as compared with the memory control device 122 of FIG. 4.

With the circuit scale of the memory control device 122 reduced, it contributes to power saving and performance improvement of the CPU 111. Furthermore, even in a case where the number of banks of the memory 112 or the throughput increases, it is possible to achieve similar control only by adding a small amount of circuits to the memory control device 122.

Figure 10A:
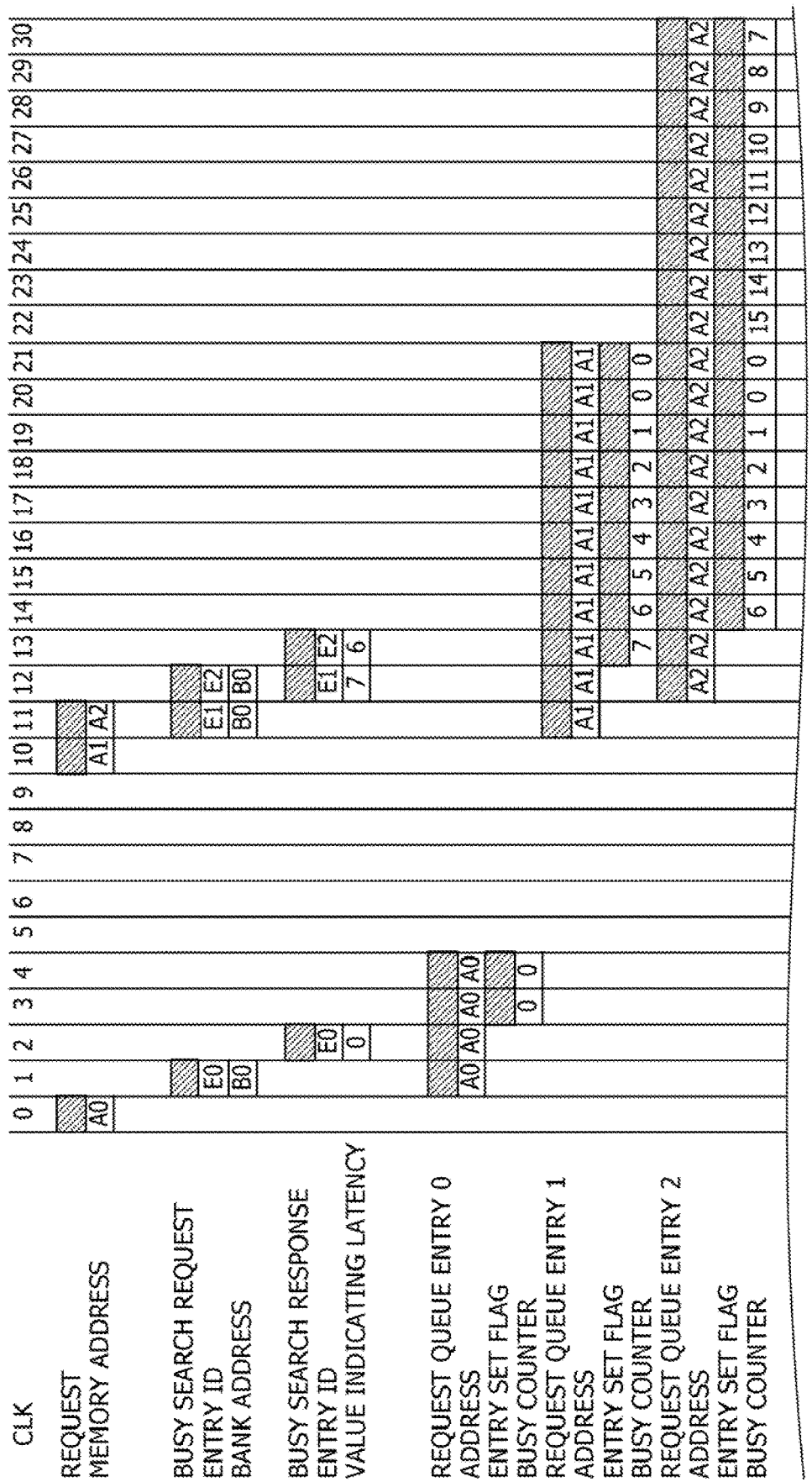
FIGS. 10A and 10B are a timing chart of a request process.
Figure 10B:
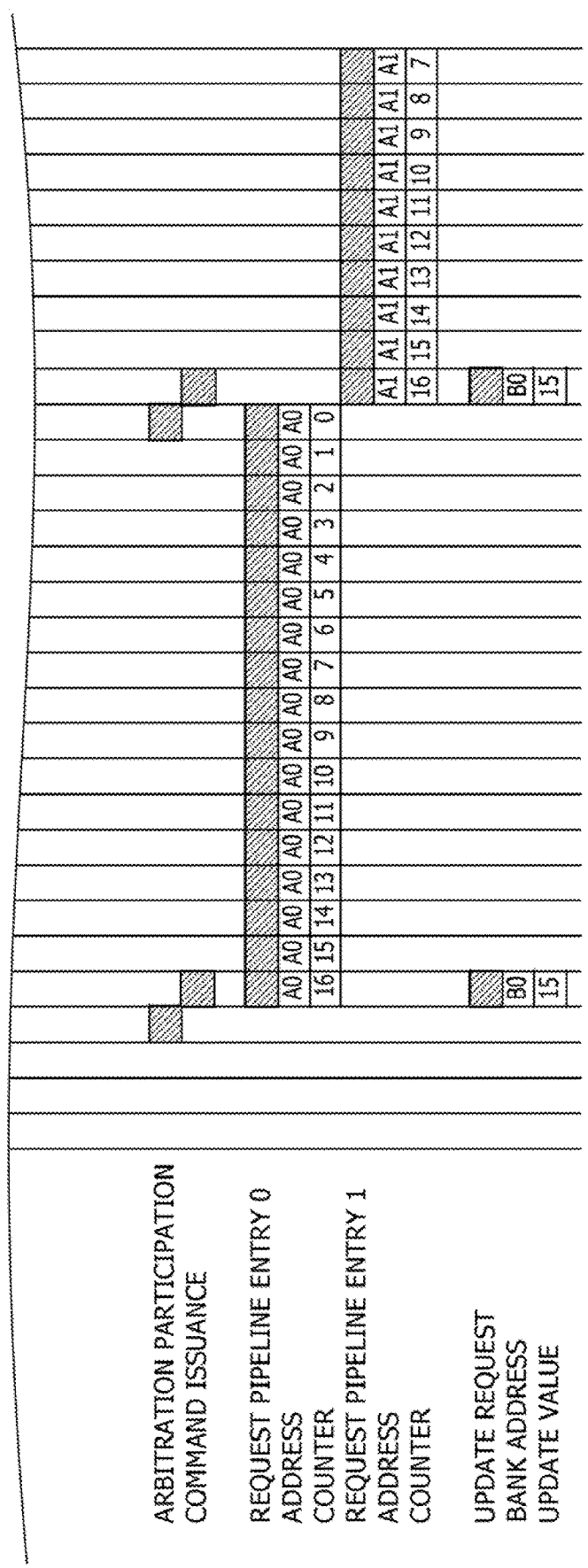

FIGS. 10A and 10B are a timing chart illustrating an exemplary request process performed by the memory control device 122 of FIG. 8. CLK represents a clock cycle. A shaded rectangle of a request represents an input of a request from the input unit 811, and a memory address under a request represents an address included in the request. Memory addresses "A0", "A1", and "A2" include a bank address "B0" of a specific bank contained in the memory 112.

A shaded rectangle of a busy search request represents a busy search request transmitted from the reception unit 812 to the search unit 818. Entry ID and a bank address under a busy search request represents entry ID and a bank address included in the busy search request.

A shaded rectangle of a busy search response represents a busy search response transmitted from the search unit 818 to the comparison unit 912. Entry ID and a value indicating latency under a busy search response represents entry ID and a value indicating latency included in the busy search response.

Request queue entries 0 to 2 represent the entries 911-0 to 911-2 in the request queue 813. A shaded rectangle of a request queue entry i (i=0, 1, 2) indicates that the valid flag V of the request queue entry i is the logic "1".

An address, an entry set flag, and a busy counter under the request queue entry i represent an address, an entry set flag S, and a busy counter included in the entry 911-i. A shaded rectangle of an entry set flag indicates that the entry set flag S is the logic "1".

A shaded rectangle of arbitration participation represents an output of a request from the check unit 915 to the arbitration unit 814, and a shaded rectangle of command issuance represents issuance of a command corresponding to the request.

Request pipeline entry 0 and a request pipeline entry 1 represent an entry in the request pipeline 815. A shaded rectangle of a request pipeline entry i (i=0, 1) indicates that the request pipeline entry i is valid. An address and a counter under the request pipeline entry i represent an address and a counter included in the request pipeline entry i.

A shaded rectangle of an update request represents an update request transmitted from the generation unit 817 to the comparison unit 913. A bank address and an update value under an update request represents a bank address and an update value included in the update request.

First, in a CLK "0", a request including the memory address "A0" is input. Next, in a CLK "1", the memory address "A0" of the request is set to the address of the request queue entry 0, and the valid flag V of the request queue entry 0 is changed to the logic "1". Then, a busy search request including entry ID "E0" and the bank address "B0" is transmitted to the search unit 818.

In this case, since no request pipeline entry i is valid, in a CLK "2", a value indicating latency is set to "0", and a busy search response including the entry ID "E0" and the value "0" is transmitted from the search unit 818.

Next, in a CLK "3", the value "0" included in the busy search response is set in the busy counter of the request queue entry 0, and the entry set flag S of the request queue entry 0 is changed to the logic "1". At this time, since the busy counter is "0", the request of the request queue entry 0 is output to the arbitration unit 814.

Next, in a CLK "4", a command corresponding to the output request is issued, and the request pipeline entry 0 becomes valid. Then, the address "A0" and T0 of the request queue entry 0 are set in the address and the counter of the request pipeline entry 0, respectively. In this example, T0=16 is satisfied. Accordingly, an update value "15" is obtained by subtracting one from "16", and an update request including the bank address "B0" and the update value "15" is transmitted from the generation unit 817.

The request retained in the request pipeline entry 0 is an example of a first processed entry, and the issued command is an example of a first issued command.

Next, in a CLK "5", the valid flag V and the entry set flag S of the request queue entry 0 are changed to the logic "0". The counter of the request pipeline entry 0 is decremented by one for each clock cycle, and becomes "0" in a CLK "20".

In a CLK "10", a request including the memory address "A1" is input. Next, in a CLK "11", the memory address "A1" of the request is set to the address of the request queue entry 1, and the valid flag V of the request queue entry 1 is changed to the logic "1". Then, a busy search request including entry ID "E1" and the bank address "B0" is transmitted to the search unit 818.

In this case, since the request pipeline entry 0 is valid and the address "A0" including the bank address "B0" included in the busy search request is included, in a CLK "12", a counter "8" is obtained from the request pipeline entry 0. Then, a value "7" indicating latency is obtained by subtracting one from "8", and a busy search response including the entry ID "E1" and the value "7" is transmitted from the search unit 818.

Next, in a CLK "13", the value "7" included in the busy search response is set in the busy counter of the request queue entry 1, and the entry set flag S of the request queue entry 1 is changed to the logic "1". The busy counter of the request queue entry 1 is decremented by one for each clock cycle, and becomes "0" in the CLK "20".

In the CLK "11", a request including the memory address "A2" is input. Next, in the CLK "12", the memory address "A2" of the request is set to the address of the request queue entry 2, and the valid flag V of the request queue entry 2 is changed to the logic "1". Then, a busy search request including entry ID "E2" and the bank address "B0" is transmitted to the search unit 818.

In this case, since the request pipeline entry 0 is valid and the address "A0" including the bank address "B0" included in the busy search request is included, in the CLK "13", a counter "7" is obtained from the request pipeline entry 0. Then, a value "6" indicating latency is obtained by subtracting one from "7", and a busy search response including the entry ID "E2" and the value "6" is transmitted from the search unit 818.

Next, in a CLK "14", the value "6" included in the busy search response is set in the busy counter of the request queue entry 2, and the entry set flag S of the request queue entry 2 is changed to the logic "1". The busy counter of the request queue entry 2 is decremented by one for each clock cycle, and becomes "0" in the CLK "20".

Since the busy counters of the request queue entry 1 and the request queue entry 2 have become "0" in the CLK "20", the requests of the request queue entry 1 and the request queue entry 2 are output to the arbitration unit 814.

Next, in a CLK "21", the request of the request queue entry 1 is selected, and the command corresponding to the request is issued. At this time, the request pipeline entry 0 becomes invalid, and the request pipeline entry 1 becomes valid.

Then, the address "A1" and "16" of the request queue entry 1 are set in the address and the counter of the request pipeline entry 1, respectively. Moreover, an update value "15" is obtained by subtracting one from "16", and an update request including the bank address "B0" and the update value "15" is transmitted from the generation unit 817.

The request retained in the request pipeline entry 1 is an example of a second processed entry, and the issued command is an example of a second issued command.

Next, in a CLK "22", the valid flag V and the entry set flag S of the request queue entry 1 are changed to the logic "0". The counter of the request pipeline entry 1 is decremented by one for each clock cycle.

The bank address "B0" included in the address "A2" of the request queue entry 2 matches the bank address "B0" included in the update request. Therefore, in the CLK "22", the update value "15" included in the update request is set in the busy counter of the request queue entry 2. The busy counter of the request queue entry 2 is decremented by one for each clock cycle.

Figure 11:
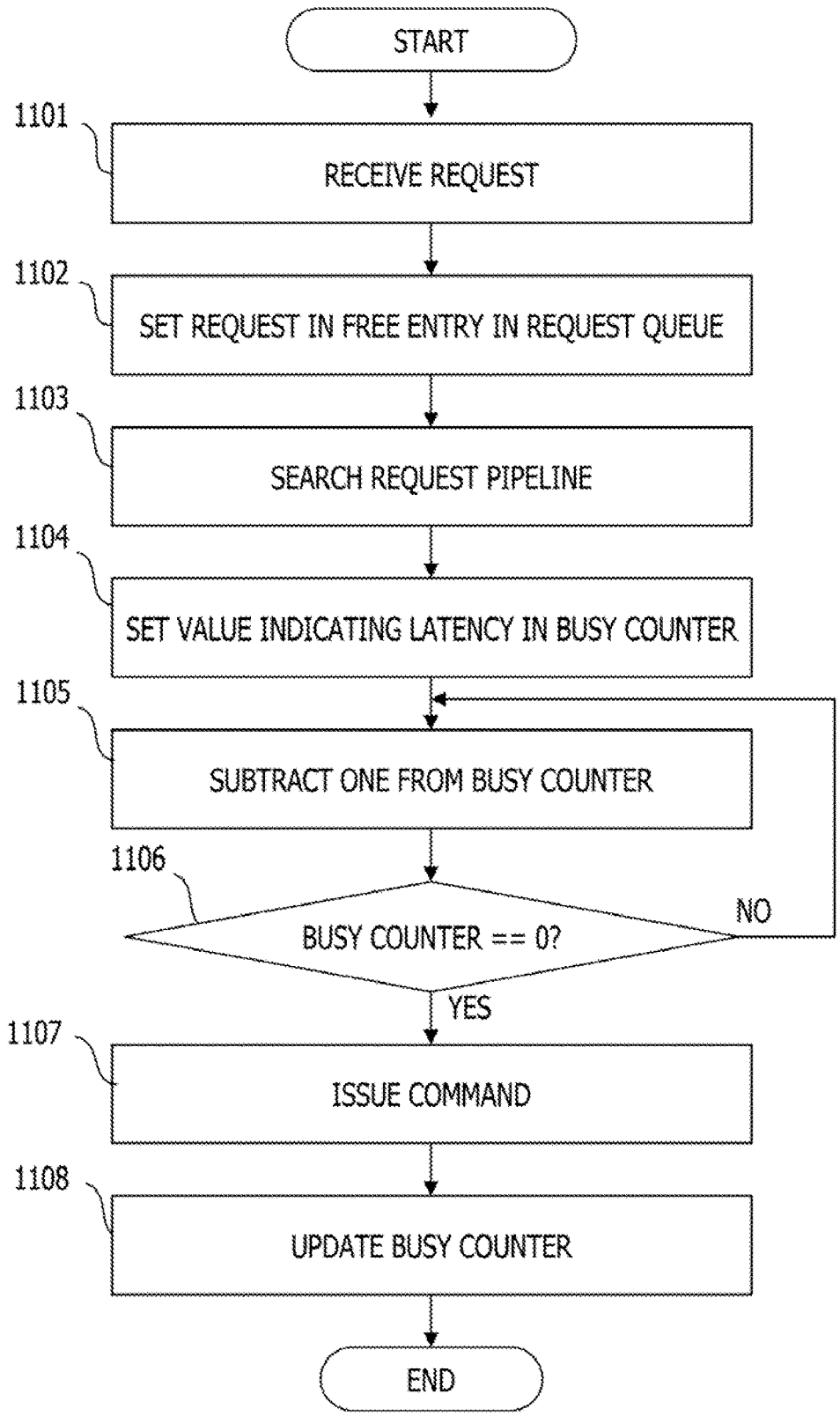
FIG. 11 is a flowchart of the request process.

FIG. 11 is a flowchart illustrating an exemplary request process performed by the memory control device 122 of FIG. 8. First, when a request transmitted from the core 121 is input from the input unit 811, the reception unit 812 receives the input request (step 1101). Then, the reception unit 812 searches the request queue 813 for a free entry, and sets the received request in the entry 911-k, which is a free entry (step 1102).

Next, the reception unit 812 generates a busy search request including the entry ID of the entry 911-k and the bank address included in the address of the entry 911-k, and transmits it to the search unit 818.

The search unit 818 searches the request pipeline 815 for the entry having the address including the bank address included in the received busy search request, and obtains a counter value from the entry (step 1103). Then, the search unit 818 generates a busy search response including the entry ID included in the busy search request and a value indicating the latency based on the obtained value, and transmits it to the comparison unit 912 associated with each entry 911-$i$ in the request queue 813.

In this case, the entry ID included in the busy search response matches the entry ID of the entry 911-$k$. Accordingly, the comparison unit 912 associated with the entry 911-$k$ sets the value indicating the latency included in the busy search response in the busy counter of the entry 911-$k$ (step 1104).

Next, the subtraction unit 914 associated with the entry 911-$k$ subtracts one from the busy counter for each clock cycle (step 1105). Then, the check unit 915 associated with the entry 911-$k$ compares the value of the busy counter of the entry 911-$k$ with zero (step 1106). If the value of the busy counter is not zero (NO in step 1106), the memory control device 122 repeats the processing of step 1105 and subsequent steps.

If the value of the busy counter is zero (YES in step 1106), the check unit 915 outputs the request retained in the entry 911-$k$ to the arbitration unit 814, and the arbitration unit 814 outputs the request to the request pipeline 815. Then, the issuing unit 819 issues a command corresponding to the request output from the arbitration unit 814 to the I/O control device 123 (step 1107).

Next, the generation unit 817 generates an update request including the bank address of the access target bank of the output request and an update value indicating the latency, and transmits it the comparison unit 913 associated with each entry 911-$i$ in the request queue 813.

The comparison unit 913 associated with each entry 911-$i$ compares the bank address included in the address of the entry 911-$i$ with the bank address included in the update request. If the bank address included in the update request matches the bank address included in the address of the entry 911-$i$, the comparison unit 913 updates the busy counter of the entry 911-$i$ using the update value included in the update request (step 1108).

The configuration of the information processing apparatus 101 of FIG. 1 is merely an example, and some constituent elements may also be omitted or modified depending on the use or conditions of the information processing apparatus 101. For example, the information processing apparatus 101 may also include an auxiliary storage device or a communication device, and the CPU 111 may also include a plurality of cores.

The configuration of the memory control device 122 of FIG. 4 is merely an example, and some constituent elements may also be omitted or modified depending on the configuration or conditions of the information processing apparatus 101. The configuration of the check unit 421 of FIG. 5 is merely an example, and some constituent elements may also be omitted or modified depending on the configuration or conditions of the memory control device 122.

The configuration of the control device 601 of FIG. 6 is merely an example, and some constituent elements may also be omitted or modified depending on the use or conditions of the control device 601. The configuration of the memory control device 122 of FIG. 8 is merely an example, and some constituent elements may also be omitted or modified depending on the configuration or conditions of the information processing apparatus 101. The configuration of the request queue 813 of FIG. 9 is merely an example, and some constituent elements may also be omitted or modified depending on the configuration or conditions of the memory control device 122.

The timing charts illustrated in FIGS. 2, 3, and 10 are merely examples, and the request process changes depending on the request input to the memory control device 122. The flowcharts of FIGS. 7 and 11 are merely examples, and some steps may be omitted or modified depending on the configuration or conditions of the control device 601 or the memory control device 122.

While the disclosed embodiment and the advantages thereof have been described in detail, those skilled in the art will be able to make various modifications, additions, and omissions without departing from the scope of the embodiment as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
receive an access request directed to an access target and sets the access request in any one of a plurality of pending entries each of which includes latency information; issue a command that corresponds to the access request;
control issuance of the command based on the latency information of the any one of the pending entries;
set a value that indicates latency for the access request in the latency information of the any one of the pending entries; and
subtract a predetermined value from the latency information of the any one of the pending entries for each unit of time,
the processor: manages the remaining time information; and obtains the remaining time information, each of a plurality of processed entries each of which includes remaining time information further includes an access request that corresponds to an issued command that has issued prior to the command, the remaining time information of each of the plurality of processed entries indicates a remaining time until a next command of the issued command becomes issuable, the processor: when a first issued command is issued, sets a value that indicates a predetermined time in the remaining time information of a first processed entry that includes an access request that corresponds to the first issued command among the plurality of processed entries, and subtracts the predetermined value from the remaining time information of the first processed entry for each of the units of time, when the access request is received, transmits a time acquisition request, and obtains the remaining time information from the first processed entry based on the time acquisition request, and transmits the value that indicates the latency for the access request to the any one of the pending entries based on the obtained remaining time information.

2. The information processing according to claim 1, wherein the any one of the pending entries further includes first identification information that indicates the any one of the pending entries, the time acquisition request includes the first identification information, the processor transmits a time acquisition response that includes the first identification information included in the time acquisition request as second identification information and includes the value that indicates the latency for the access request to each of the plurality of pending entries, and in a case where the second identification information included in the time acquisition response matches the first identification information of the any one of the pending entries, sets the value that indicates the latency for the access request included in the time acquisition response in the latency information of the any one of the pending entries.

3. The information processing according to claim 1, wherein the processor: transmits, when a second issued command is issued after the first issued command, an update value that indicates updated latency for the access request to the any one of the pending entries based on the value that indicates the predetermined time, sets the update value in the latency information of the any one of the pending entries, and when the second issued command is issued, sets the value that indicates the predetermined time in the remaining time information of a second processed entry that includes an access request that corresponds to the second issued command among the plurality of processed entries.

4. The information processing according to claim 3, wherein the access target is any one of a plurality of banks included in a storage device, the processor, when the access request is received, sets first bank information that indicates the any one of the banks in the any one of the pending entries, transmits an update request that includes second bank information that indicates, among the plurality of banks, an access target bank of the access request that corresponds to the second issued command and the update value to each of the plurality of pending entries, and in a case where the second bank information included in the update request matches the first bank information of the any one of the pending entries, sets the update value included in the update request in the latency information of the any one of the pending entries.

5. A control method for causing a control device to execute a process comprising:
receiving an access request directed to an access target;
setting the access request in any one of a plurality of pending entries each of which includes latency information;
setting a value that indicates latency for the access request in the latency information of the any one of the pending entries;
subtracting a predetermined value from the latency information of the any one of the pending entries for each unit of time; and
controlling issuance of a command that corresponds to the access request based on the latency information of the any one of the pending entries,
the control device includes a plurality of processed entries each of which includes an access request that corresponds to an issued command that has issued prior to the command and remaining time information that indicates a remaining time until a next command of the issued command becomes issuable, the method for causing the control device to execute the process further including: setting, when a first issued command is issued, a value that indicates a predetermined time in the remaining time information of a first processed entry that includes an access request that corresponds to the first issued command among the plurality of processed entries; subtracting the predetermined value from the remaining time information of the first processed entry for each of the units of time; generating a time acquisition request when the access request is received; and obtaining the remaining time information from the first processed entry based on the time acquisition request, and the setting the value that indicates the latency for the access request includes setting the value that indicates the latency for the access request in the latency information of the any one of the pending entries based on the obtained remaining time information.

6. The control method according to claim 5, wherein the any one of the pending entries further includes first identification information that indicates the any one of the pending entries, the time acquisition request includes the first identification information, and the setting the value that indicates the latency for the access request in the latency information of the any one of the pending entries based on the obtained remaining time information includes: generating a time acquisition response that includes the first identification information included in the time acquisition request as second identification information and includes the value that indicates the latency for the access request; and setting the value that indicates the latency for the access request included in the time acquisition response in the latency information of the any one of the pending entries in a case where the second identification information included in the time acquisition response matches the first identification information of the any one of the pending entries.

7. The control method according to claim 5, the method for causing the control device to execute the process further comprising: setting, when a second issued command is issued after the first issued command, the value that indicates the predetermined time in the remaining time information of a second processed entry that includes an access request that corresponds to the second issued command among the plurality of processed entries; and setting an update value that indicates updated latency for the access request in the latency information of the any one of the pending entries based on the value that indicates the predetermined time.

8. The control method according to claim 7, wherein the access target is any one of a plurality of banks included in a storage device, the setting the access request in the any one of the pending entries includes setting first bank information that indicates the any one of the banks in the any one of the pending entries, and the setting the update value in the latency information of the any one of the pending entries includes: generating an update request that includes second bank information that indicates, among the plurality of banks, an access target bank of the access request that corresponds to the second issued command and the update value; and setting the update value included in the update request in the latency information of the any one of the pending entries in a case where the second bank information included in the update request matches the first bank information of the any one of the pending entries.

* * * * *